Figure 1:
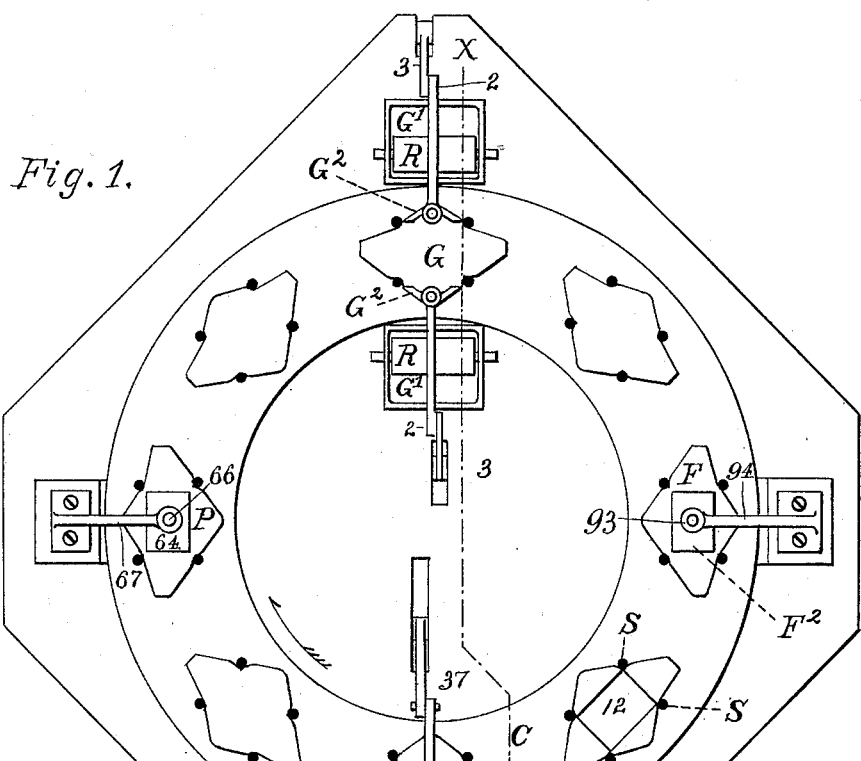

(No Model.) 10 Sheets—Sheet 1.

F. H. RICHARDS.
ENVELOPE MACHINE.

No. 401,718. Patented Apr. 16, 1889.

Witnesses:
C. O. Palmer.
H. F. L. Orcutt.

Inventor.
Francis H. Richards.

(No Model.)  F. H. RICHARDS.  10 Sheets—Sheet 2.
ENVELOPE MACHINE.

No. 401,718.  Patented Apr. 16, 1889.

Witnesses:
C. O. Palmer.
H. F. L. Orcutt.

Inventor.
Francis H. Richards.

(No Model.)  10 Sheets—Sheet 3.

F. H. RICHARDS.
ENVELOPE MACHINE.

No. 401,718. Patented Apr. 16, 1889.

Witnesses:
C. O. Palmer.
H. F. L. Orcutt.

Inventor.
Francis H. Richards.

(No Model.) 10 Sheets—Sheet 4.
F. H. RICHARDS.
ENVELOPE MACHINE.

No. 401,718. Patented Apr. 16, 1889.

Witnesses:
Wilbur M. Stone.
John Johnston

Inventor:
Francis H. Richards (No Model.) 10 Sheets—Sheet 5.

F. H. RICHARDS.
ENVELOPE MACHINE.

No. 401,718. Patented Apr. 16, 1889.

Witnesses:
Wilbur M. Stone
John Johnston.

Inventor:
Francis H. Richards (No Model.)　　　　　　　　F. H. RICHARDS.　　　10 Sheets—Sheet 6.
ENVELOPE MACHINE.

No. 401,718.　　　　　　　　　　　　Patented Apr. 16, 1889.

Witnesses:　　　　　　　　　　　　Inventor:
Wilbur M. Stone.
John Johnston　　　　　　　　　　Francis H. Richards

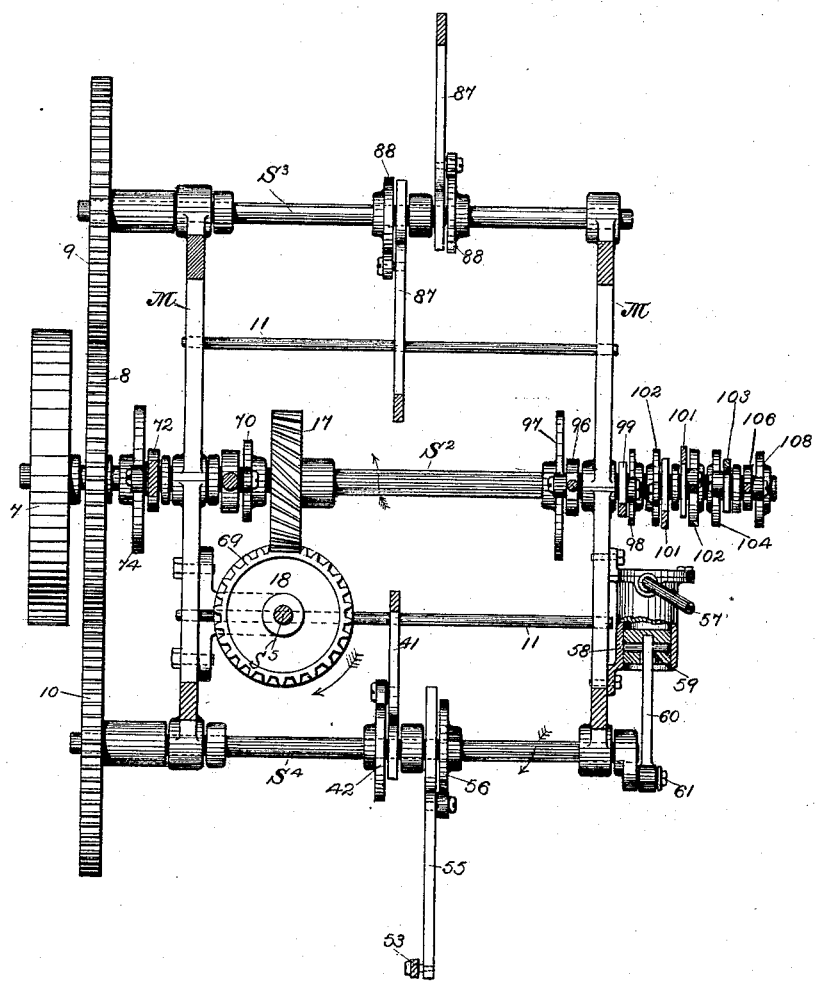

(No Model.) 10 Sheets—Sheet 8.
F. H. RICHARDS.
ENVELOPE MACHINE.
No. 401,718. Patented Apr. 16, 1889.
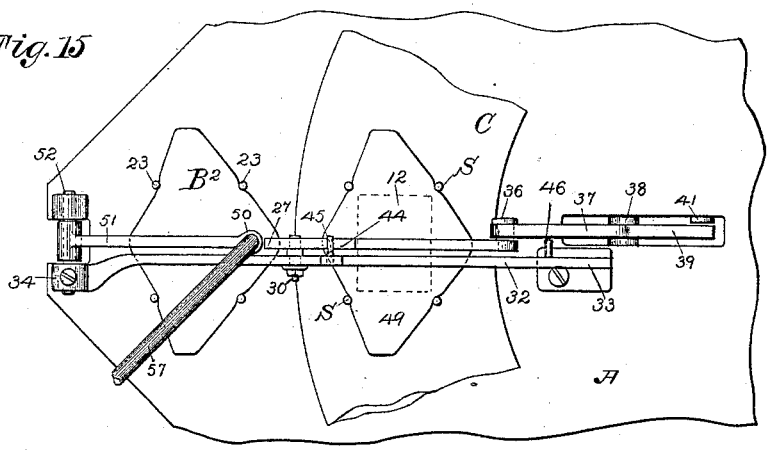
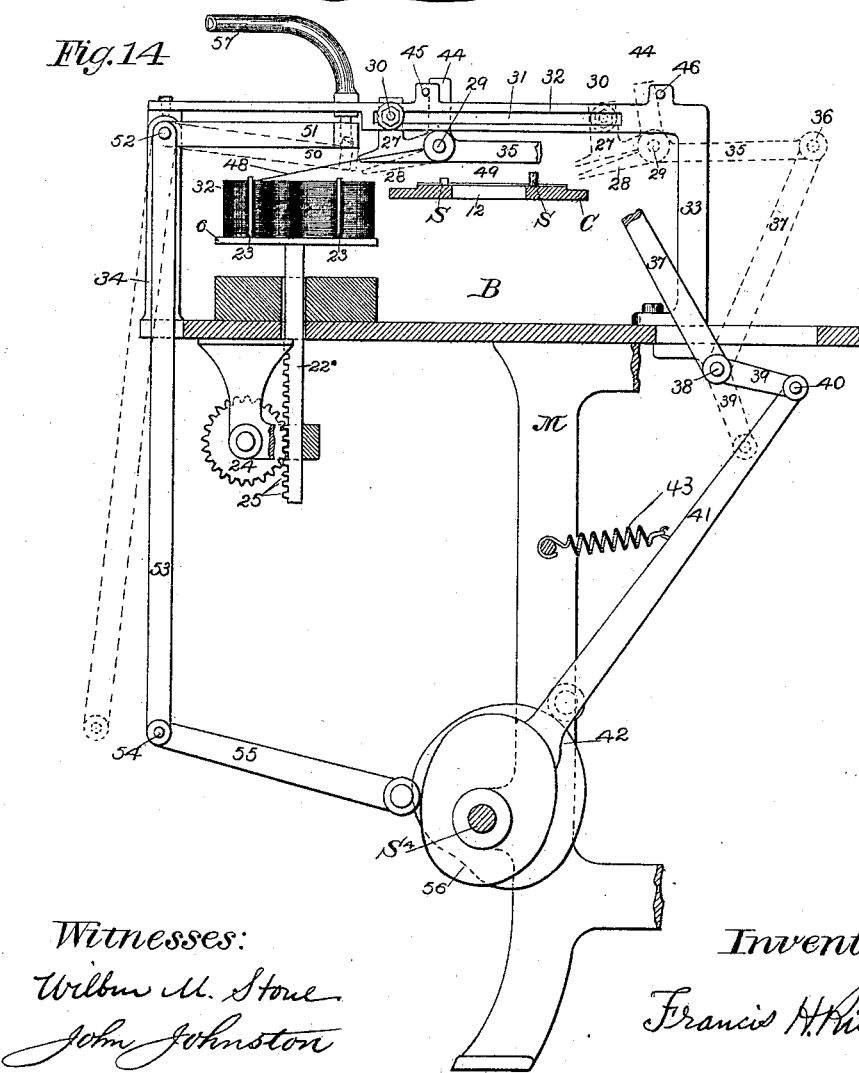
Witnesses:
Wilbur M. Stone
John Johnston
Inventor:
Francis H. Richards (No Model.) 10 Sheets—Sheet 9.
F. H. RICHARDS.
ENVELOPE MACHINE.
No. 401,718. Patented Apr. 16, 1889.
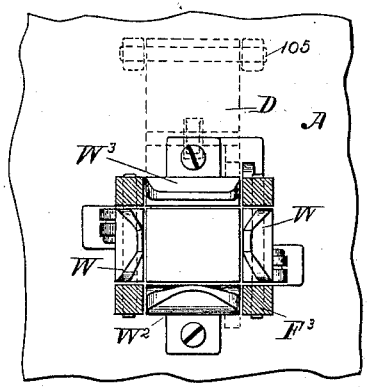
Fig. 18.
Fig. 17
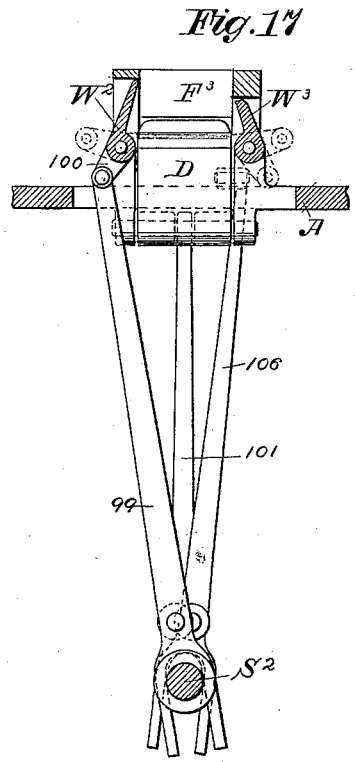
Fig. 16
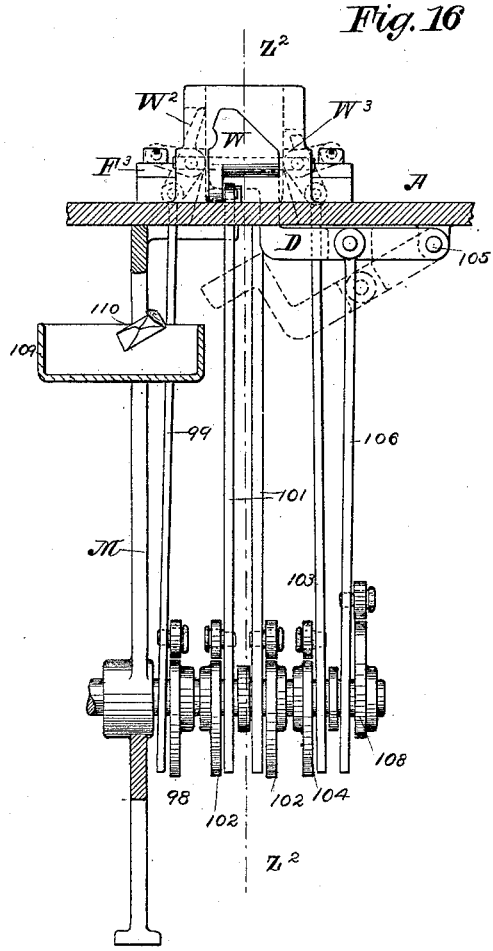
Witnesses:
Wilbur M. Stone.
John Johnston
Inventor:
Francis H. Richards.

(No Model.)　　　　　　　　　F. H. RICHARDS.　　　　10 Sheets—Sheet 10.
ENVELOPE MACHINE.

No. 401,718.　　　　　　　　　　　　Patented Apr. 16, 1889.

Witnesses:　　　　　　　　　　　　　　　Inventor:
Wilbur M. Stone　　　　　　　　　　　　Francis H. Richards
John Johnston

UNITED STATES PATENT OFFICE.

FRANCIS H. RICHARDS, OF SPRINGFIELD, MASSACHUSETTS, ASSIGNOR OF ONE-HALF TO THE PRATT & WHITNEY COMPANY, OF HARTFORD, CONNECTICUT.

ENVELOPE-MACHINE.

SPECIFICATION forming part of Letters Patent No. 401,718, dated April 16, 1889.

Application filed April 21, 1884. Serial No. 128,619. (No model.)

*To all whom it may concern:*

Be it known that I, FRANCIS H. RICHARDS, a citizen of the United States, residing at Springfield, in the county of Hampden and State of Massachusetts, have invented new and useful Improvements in Envelope-Machines, of which the following is a specification, reference being had to the accompanying drawings, forming a part thereof.

My invention relates to that general class of envelope-making machinery which is adapted to receive a pile of envelope-blanks previously cut to the required shape, to automatically take them up one at a time and apply gum to their flaps, and to fold them into completed envelopes, ready for use.

It has for its object to furnish a system of such machinery especially adapted for making envelopes which are to be printed or stamped with a Government stamp, or both, during the process of manufacture. For the attainment of this object it consists in a system of operative mechanisms situated at regular fixed stations in a fixed circuit, of which system each mechanism is especially adapted to perform one particular step or operation in the process of taking an envelope-blank from a pile of blanks and making it into a completed plain, printed, or stamped envelope, as the case may be, and in a blank-carrying mechanism adapted to travel in a corresponding circuit and having a series of blank-holding devices corresponding, when at rest, to the stations of the first circuit, each of said devices being adapted to receive an envelope-blank from a blank-feeding mechanism and to present it successively to the other mechanisms of the system. The number of operative mechanisms composing the series stationed in the first-named circuit, which I will call the "lower" circuit of the system, depends upon the number of operations to be performed in making a blank into a completed envelope. When printed envelopes are made, this number of operations is usually four, as follows: first, feeding the blanks to the blank-carrier; second, printing or stamping the blank; third, applying gum to the flaps, and, fourth, folding the blank into a completed envelope.

By the herein-described new organization of the machine, whereby the envelopes are gummed after they are printed, the curling of the paper while printing, due to the action of the wet gum, is avoided.

When the blanks are to be printed or stamped more than once, a corresponding number of mechanisms must of course be provided therefor, or, what is equivalent thereto, one mechanism must be provided having a capacity to receive and operate the required number of printing dies or forms. When plain—that is, unprinted and unstamped—envelopes are to be made, the printing mechanism is simply allowed to remain unused, or it is not made an element of the system, as may be preferred.

The form of the circuit in which the several operative mechanisms are stationed may be determined according to the circumstances in any particular case attending its reduction to practice. I prefer to make this circuit to have the form of a circle, because the mechanisms are then most compactly arranged, and because the machinery for operating them may then be, in my opinion, more simple and easily constructed, especially when the number of mechanisms in said circuit does not exceed five or six. It is for these reasons that I have selected this arrangement for the principal illustrations of my invention.

Figure 2:
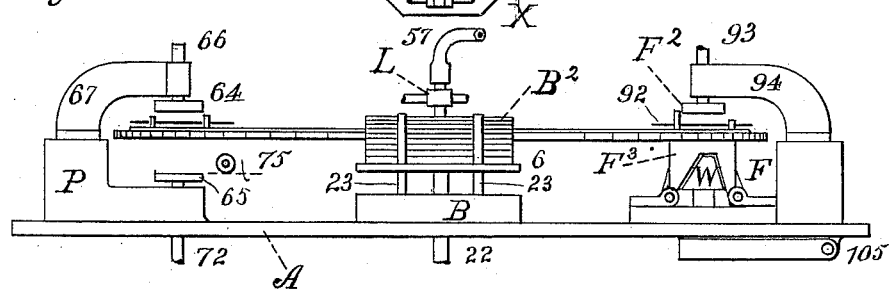
Figure 3:
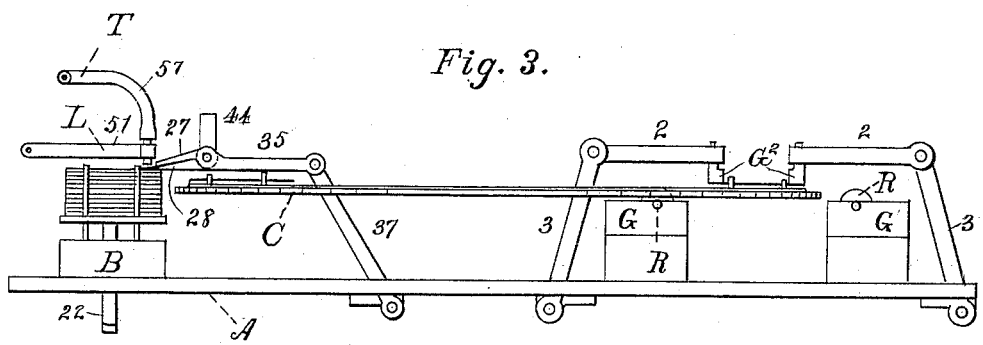
Figure 4:
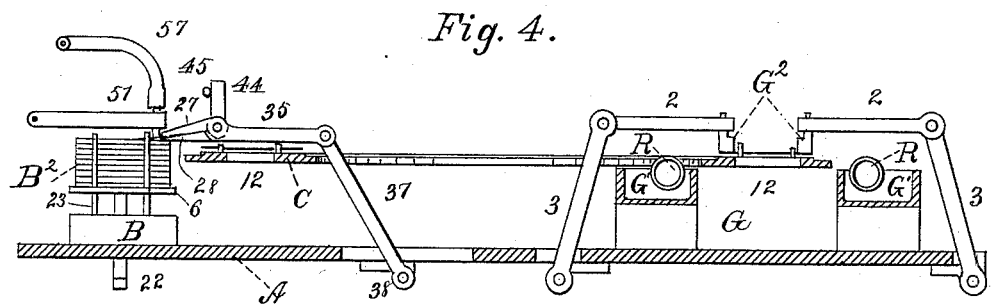
Figure 9:
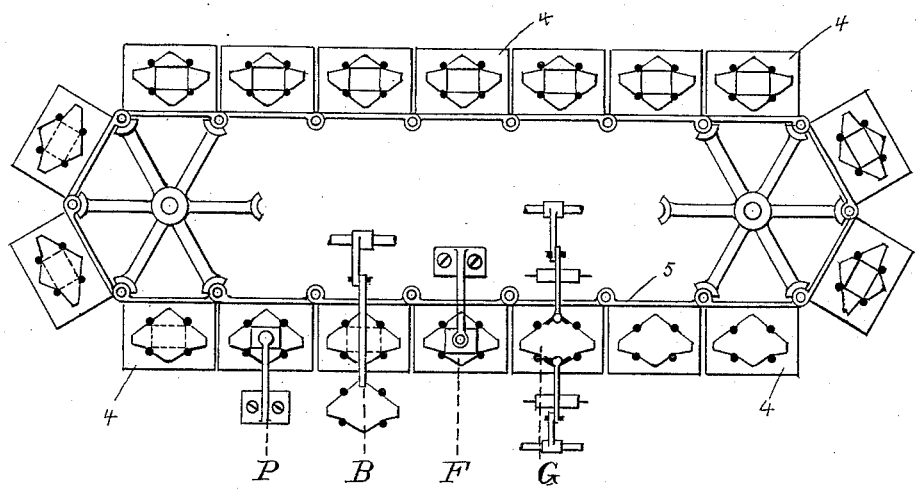
Figure 5:
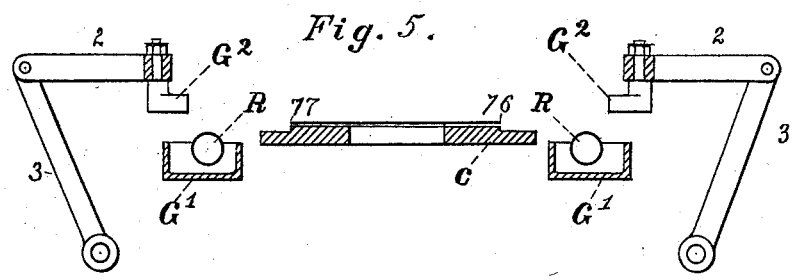
Figure 6:
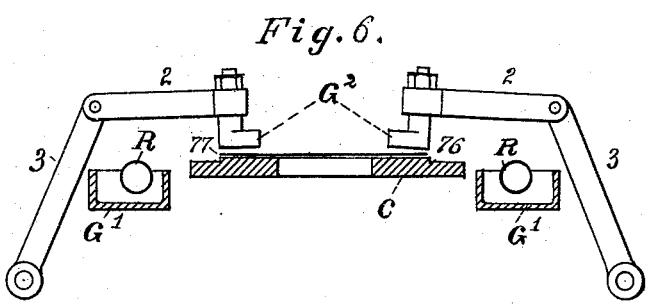
Figure 7:
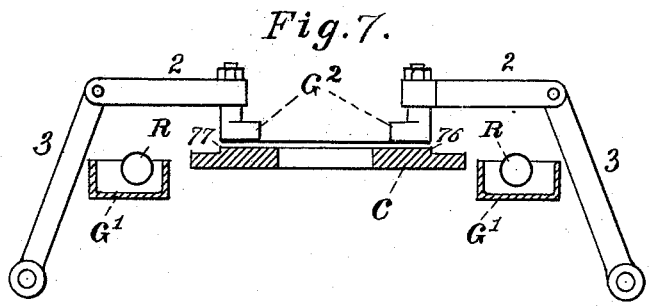
Figure 8:
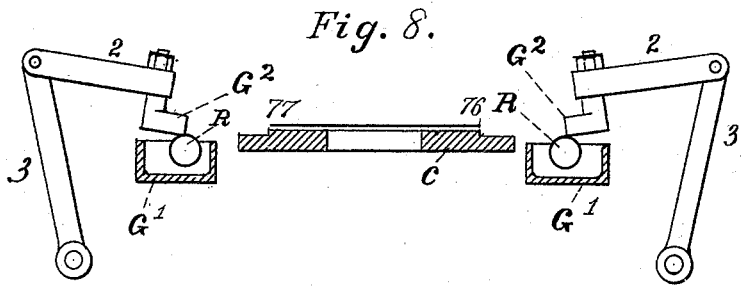
Figure 10:
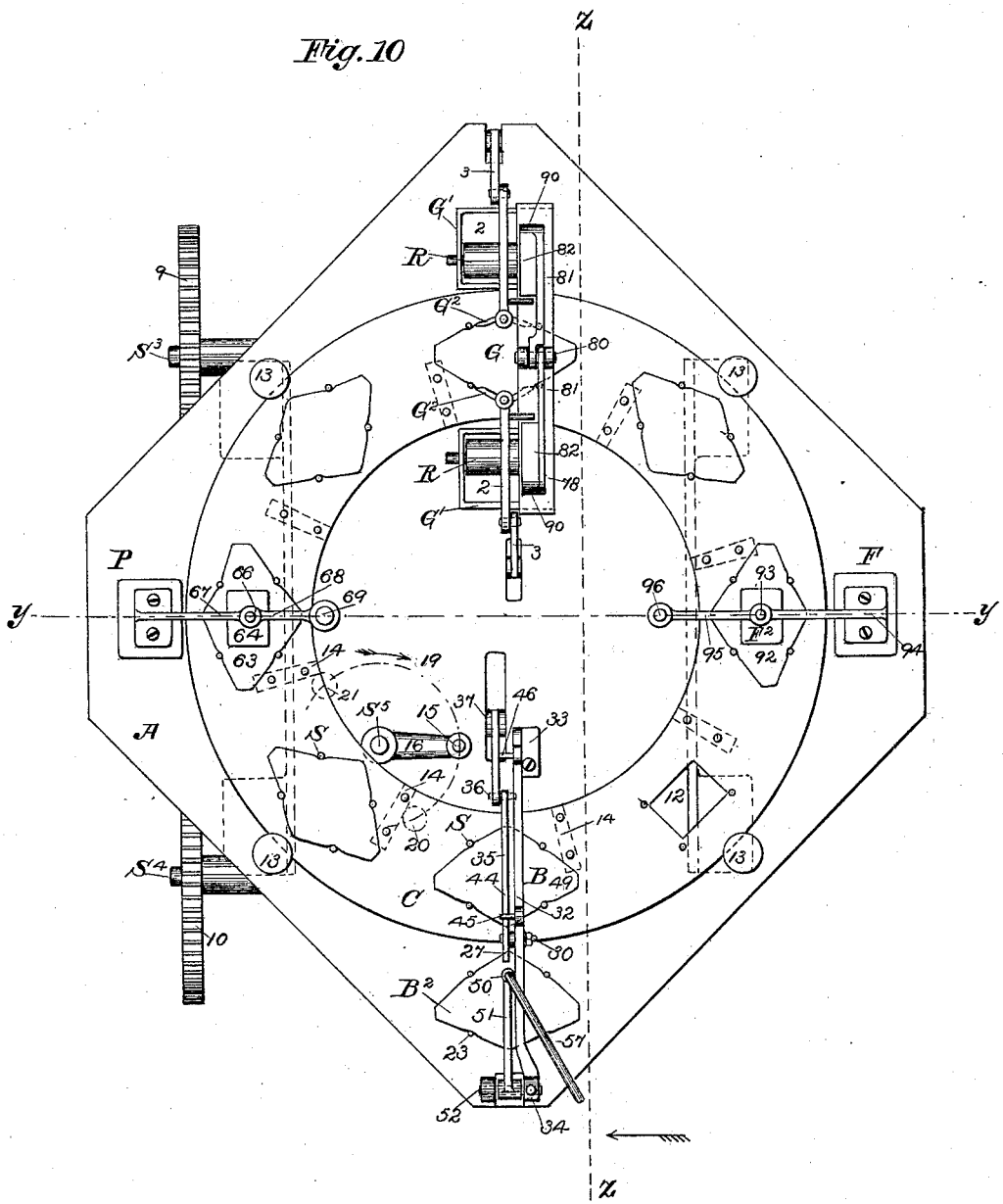
Figure 11:
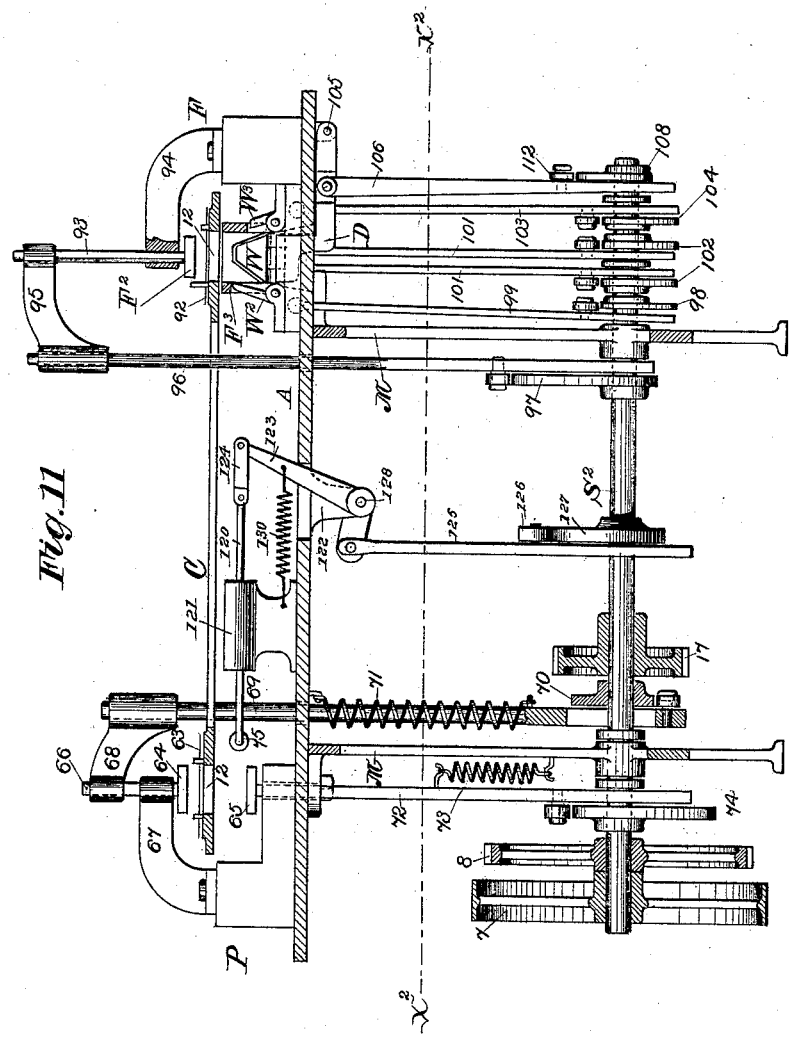
Figure 12:
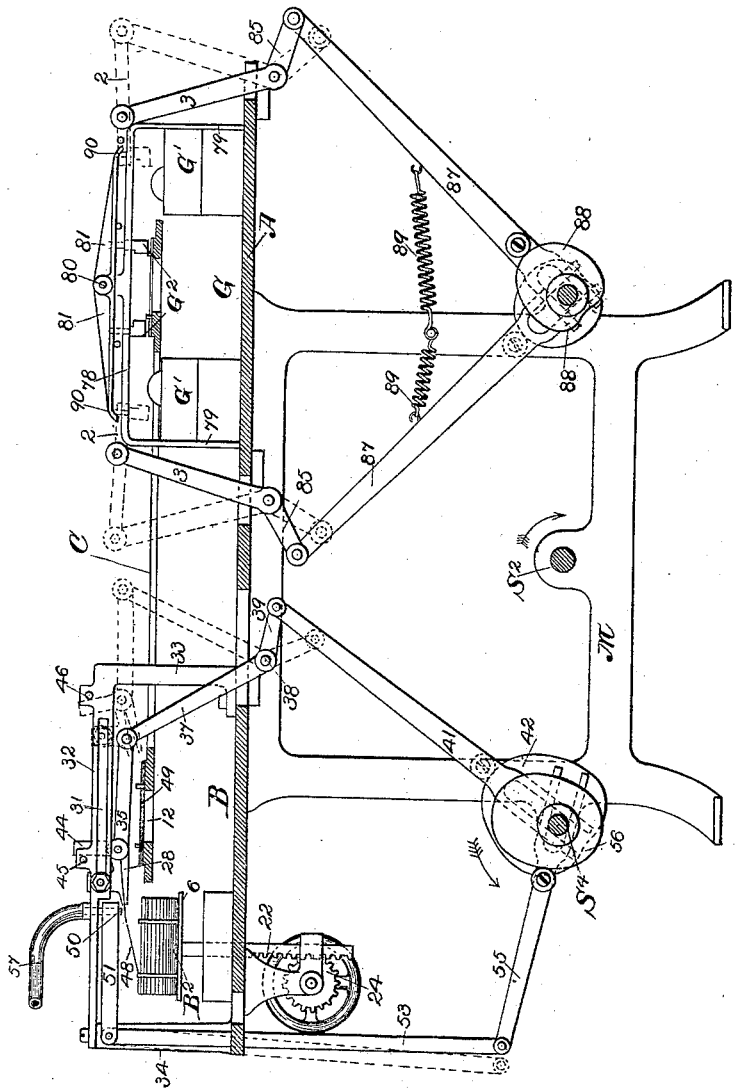
Figure 19:
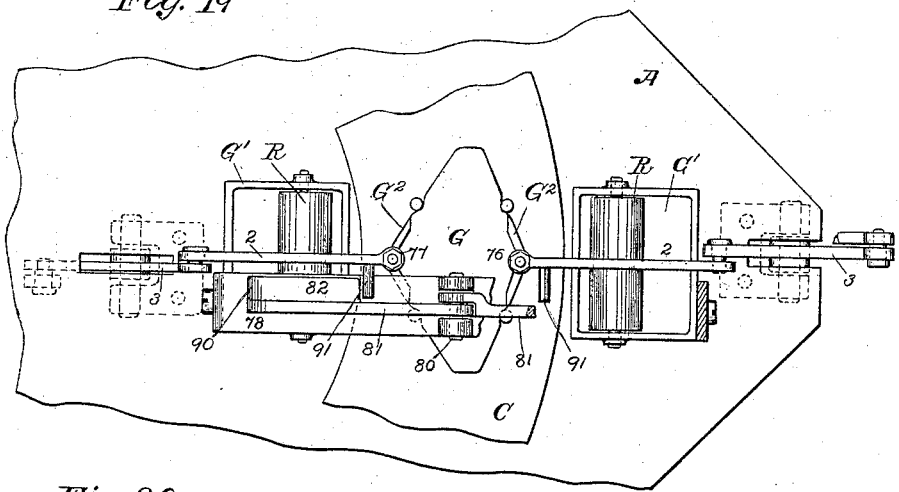
Figure 20:
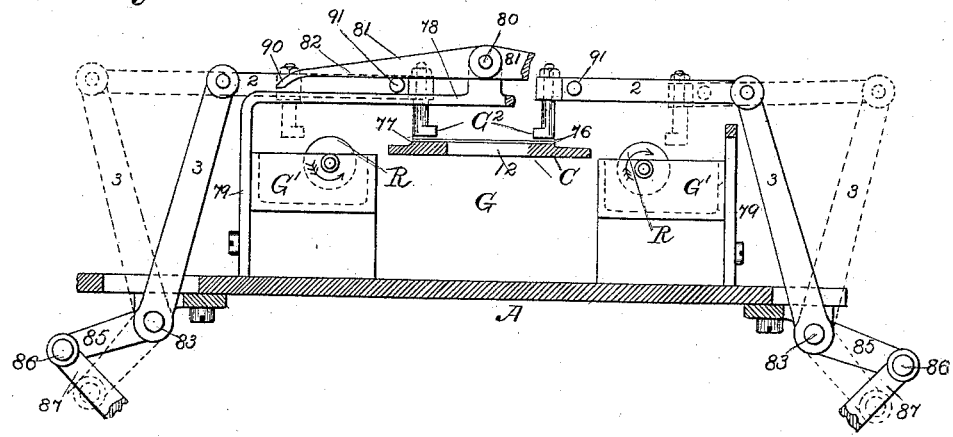

In the drawings, Figure 1 is a plan view of the principal parts of a system of envelope-making machinery embodying my invention. Fig. 2 is a front elevation of the same. Fig. 3 is an elevation of the side at the right-hand in Fig. 1, the folding and printing mechanisms not being shown. Fig. 4 is a vertical section in or near the line X X, Fig. 1. Fig. 5 is a partial and enlarged vertical section near line X X, Fig. 1, through the gumming mechanism. Figs. 6, 7, and 8 are views similar to Fig. 5, showing the parts in different positions. Fig. 9 is a plan view of an arrangement of the mechanisms in a circuit which is not a circle. The figures above described do not show driving mechanism for operating the several principal parts. One form of ordinary mechanism is shown in the complete machine, which is illustrated by the following: Fig. 10 is a top view of the complete machine. Fig. 11 is a vertical longitudinal section near line $y\ y$, Fig. 10, showing a blank-printing mechanism on the left hand and a blank folding on the right hand. Fig. 12 is a vertical transverse section (not fully lettered) in or near line Z Z, Fig. 10, showing a blank-feeding mechanism on the left hand and a blank-gumming mechanism on the right hand. Fig. 13 is a horizontal section in line $X^2\ X^2$, Fig. 11. Fig. 14 is an enlarged view of the left-hand part of Fig. 12. Fig. 15 is a similar top view of the feeding mechanism, drawn in projection with Fig. 14. Fig. 16 is an enlarged front view of some parts of the folding mechanism. Fig. 17 is a vertical section in line $Z^2\ Z^2$, Fig. 16. Fig. 18 is a top view of the folding box. Fig. 19 is an enlarged top view of the blank-gumming mechanism. Fig. 20 is a side view of the same, showing more clearly the upper right-hand part of Fig. 12.

Similar characters designate like parts in all the figures.

In describing my invention I will first explain the combination and arrangement into a system and the operation of the mechanisms, and then describe one kind of apparatus for driving them.

Referring to the first eight figures of the drawings, A designates a table suitable for supporting the several mechanisms comprised in the system.

B designates the station of the blank-feeding, P that of the blank-printing, G that of the blank-gumming, and F that of blank-folding mechanisms. Said mechanisms are here all equidistantly arranged in a circular circuit, with the blank-gumming between the blank-printing and the blank-folding mechanisms.

C is supposed to be any suitable blank-carrying table adapted to receive blanks from the blank-feeding mechanism, and to convey them first to the printing, then to the gumming, and then to the folding mechanisms. For this carrier I may use fixed guides with devices for moving along the blanks thereon—as, for instance, those shown and described for a similar purpose in United States Patent No. 177,048, dated May 2, 1876; but I prefer to use a traveling table, belt, or chain provided with guides, as S, Fig. 1, or other devices for holding the blanks thereon. It is not necessary that the number of blank-holding devices on said carrier should be equal to the number of stations in the lower circuit. The number of the former should not be less than but may exceed the number of the latter. When the number of said devices in the carrier-circuit does exceed the number of the stations in the lower circuit, these circuits should correspond with each other in such a manner that a number of the said devices in the upper circuit equal to the number of stations in the lower circuit will, when at rest, correspond in their positions with the positions of said stations. This condition is fulfilled by the arrangement in Fig. 1.

The several operative mechanisms arranged in the lower circuit may be of any construction that is consistent with the duty required to be performed by them.

The blank-feeding mechanism consists of a blank-supporting table, 6, and a blank-transferring mechanism. For operating the first one I prefer to use either a mechanism such as described in United States Patent No. 221,835, or one such as described in United States Patent No. 284,483, to both of which reference may be had. For the second one I prefer to use a mechanism having a suction taking-up device and a blank-transferring device, both substantially such as described for similar purposes in expired United States Patent No. 13,647. (Shown best in Fig. 5 of the drawings accompanying that patent.) The taking-up device is also well shown in United States Patent No. 288,673, to which reference may be had. (See Fig. 6.)

The blank printing or stamping mechanism consists, essentially, of an upper and a lower die and any suitable devices for operating them. When types are to be used for printing, one of these dies, (preferably the lower one), must be properly constructed to receive and hold them, and if ink is to be used on the types suitable inking apparatus must be provided for applying it. Such a printing mechanism as described in United States Patent No. 177,048, in which it is best shown in Figs. 11 and 25 of said patent, I consider suitable for this purpose; but there are a variety of printing mechanisms which are well known and which are applicable to the present case with slight modifications.

The gumming mechanism which I prefer to use consists of two duplicate parts arranged one on each side of the blank-carrier, so as to operate simultaneously and to apply gum to the flaps on opposite sides of the blanks while the carrier is at rest. There are several ways of constructing such a gumming mechanism, of which that shown in the drawings is, in my opinion, one of the most suitable. A similar one to this is shown in Figs. 7 and 8 of the drawings accompanying United States Patent No. 288,673, above referred to. The principal parts consists of a gum-delivering roll, R, a gummer, $G^2$, and a gum-box, $G'$, said gummer being carried by an arm, 2, operated by rocker-arm 3, substantially as shown. A suitable rotary motion is given the gum-roll R, and a "four-motion" movement is imparted to the gummer $G^2$, as illustrated in Figs. 5, 6, 7, and 8, illustrating, respectively, the four stages of such a movement. During the motion of the carrier the gummers stand, preferably, in about the position shown in Fig. 5. When the carrier stops, they are first moved to the position shown in Fig. 6, wherein they exactly correspond in their position to the surfaces of the flaps which are to be gummed. They are then brought down onto said surfaces, as shown in Fig. 7. Next they are moved horizontally off from the blank, spreading the gum smoothly thereon and over the rolls R, from which they receive a fresh supply of gum, said rolls being then revolving with a surface velocity in the same direction as and equal to that of the said gummers. Finally, they are returned to their position in Fig. 5, ready for a repetition of this entire series of operations.

The blank-folding mechanism which I consider most suitable for use in my present system of machinery is well described in United States Patent No. 58,327, and as shown herein consists, essentially, of a folding-box, $F^3$, a series of folding wings, W $W^2$ $W^3$, and a plunger, $F^2$, Figs. 1 and 2, for driving the blank from the carrier down into said box. These, as well as the mechanism for operating them, being old and well known, will be readily understood.

It will be understood from the preceding description of the construction and operation of my improved system of envelope-making machinery that each blank-receiving section of the blank-carrier C comes successively to the same mechanism-station, so that when the machinery is started up, and as soon as the blank-holders have all passed a given point in their circuit, there is one blank taken up, a second one printed or stamped, a third one gummed upon its flaps, and a fourth one folded into a completed envelope at each complete movement of the said machinery.

When the several mechanisms are arranged in a circuit that is not a circle, as shown, for instance, in Fig. 9, the blank-carrier must of course be constructed and operated accordingly. This may be done in several ways, of which the way shown in said Fig. 9 I consider a suitable one. When this carrier consists of a series of plates, 4, secured to an endless chain, 5, as there shown, those plates are preferably arranged to slide in fixed guides, (not shown,) whereby they may be made to move in a circuit exactly conformable to the stations of the lower circuit, suitable means (not shown) being provided to move them forward in their circuit intermittently uniform distances at each movement. This arrangement has the advantage of making it more convenient to use a carrier having a large number of blank-holding sections, so that a considerable time may elapse between the printing and the gumming operations, whereby the ink may be well or sufficiently dried before the gum is applied. By the old way of making printed envelopes the gum is applied before the blanks are printed, so that the ink cannot be conveniently dried before the folding of the envelope without also drying the gum, thereby preventing it from sticking properly.

It will be understood that any parts of the several mechanisms which are not particularly described, or which are not shown or described, and which pertain to the usual operations of envelope-machinery, may be constructed to operate in any suitable way to effect the desired result.

Having now described the combination of the mechanisms into a system and their operation as elements of that system, I will next describe more in detail each mechanism of which said system is in this instance composed and the actuating devices which I have adopted for operating them.

Referring to the last eleven figures, M M designate the end frames, which support the top plate, A, and have formed in them bearings for carrying the three cam-shafts $S^2$, $S^3$, and $S^4$. These frames may be tied together by rods 11, if it is deemed necessary. The first and central shaft is driven by pulley 7, and drives the other two by means of common spur-gears, 8, 9, and 10. Shaft $S^2$ operates the printing and the folding mechanisms and feeds along the carrier, shaft $S^3$ the gumming and shaft $S^4$ the blank-folding mechanisms. These shafts carry the gearing, cams, &c., necessary to operate the details of the several mechanisms.

The blank-carrying table C is an endless plate or ring, divided, in this instance, into eight parts or spaces, each having a rectangular opening, 12, Fig. 10, of the size of a folded envelope, and a series of guides, S, for holding an envelope-blank, B, centrally over said opening. Said carrier is supported by four posts, 13, Fig. 10, which are notched on their inner sides, near the top, to receive the outer edge of said plate, which is thus, in effect, a kind of circular slide. On its under side said plate is provided with a series of lugs, 14, (shown in dotted lines in Fig. 10,) corresponding in number to the aforesaid divisions of the carrier. These lugs, which may be about as deep as the thickness of the carrier, are acted on for the purpose of feeding said carrier by a crank-pin, 15, fixed in the crank 16 of vertical shaft $S^5$, which shaft is driven from shaft $S^2$ by spiral gears 17 18. The crank-pin travels at a uniform velocity in a circuit indicated by the dotted circle 19 in the direction indicated by the arrow. It strikes one of the lugs 14 at position 20 and carries it along to position 21, as fully shown in Fig. 10, thus feeding the carrier from one position to the next in less than a half of its own revolution. This carrier-feeding mechanism may be replaced by an ordinary ratchet-motion, of which there are numerous well-known forms.

At the station of the blank-feeding mechanism the blank-supporting table 6 is furnished with guides 23, for holding in place the blanks, and is upheld on a slide, 22, which is operated by pinion 24, meshing with teeth 25 on said slide. Said pinion may be operated by hand or by suitable mechanism to keep the top of the blank-pile at about the same height. When mechanism is so employed, I consider that shown and described therefor in the above-mentioned patent, No. 221,835, to be a suitable one.

For transferring blanks from the pile B², onto carrier C, I employ a nipper having upper jaw, 27, and lower jaw, 28, pivoted together at 29. The upper jaw has a stud, 30, fitted to slide in slot 31 of guide 32, which guide is supported on posts 33 34. Said upper jaw is formed on one end of a rod, 35, which at its other end is pivoted at 36 to a rocker-arm, 37, pivoted at 38, which rocker-arm (and through it the nipper) is operated by arm 39, connected at 40 to a rod, 41, that is moved in one direction by cam 42 on shaft S⁴, and in the other by spring 43. This mechanism acts to impart a reciprocating movement to the nipper between its two positions. (Shown, respectively, by solid and dotted lines in Fig. 14.)

The lower nipper-jaw, 28, is provided with an arm, 44, and the guide 32, with two stops, 45 46, for operating said arm. When the nipper goes forward toward the left hand in Fig. 14, it stands open, as shown by the dotted lines, until near the forward end of its stroke, when arm 44 strikes stop 45 and closes the lower jaw up against the upper jaw. The uppermost blank of the pile having been previously raised to position 48, is thus gripped by the nipper, and is then carried back over carrier C until said arm 44 strikes stop 46, thereby opening the lower jaw, which releases the blank and allows it to fall onto said carrier at 49 between guides S. Said blank is lifted by a suction apparatus consisting of a tube, 50, fixed in the back end of arm 51, (see Figs. 10, 14, and 15,) which is pivoted at 52 to post 34, and is operated by another arm, 53, this being connected at 54 to a rod, 55, that is moved in one direction by cam 56, (on shaft S⁴,) and in the other by a spring. (Not shown.) For holding the paper against the end of tube 50 a partial vacuum is formed therein by means of a flexible pipe, 57, leading to the cylinder 58 of an air-pump, whose piston 59 is driven by means of a rod, 60, connected to a crank, 61, that is fixed on shaft S⁴. (See Fig. 13.) This suction apparatus, which is substantially the same as long employed for similar purposes in other paper-working machinery, is supposed to be so arranged and adjusted as to lift the blank the proper distance and at the proper time to be taken by the nipper.

Having been properly placed on the carrier, the blank is thereby next conveyed to the station of the printing mechanism P, where it is held at rest, as at 63, between the upper and lower dies, 64 and 65, respectively. Said upper die is fixed to a slide, 66, working in a bearing in arm 67 and actuated by an arm, 68, which is fixed to the upper end of another slide, 69, that is moved downward by cam 70 and upward by spring 71. (Generally in other machines for this purpose the upper die, usually called a "platen," is rigidly fixed above and just out of contact with the paper. It may be so fixed in this case.)

The lower die is operated in a very similar way, being fixed to the top of a slide, 72, which is lifted up by cam 74 and drawn down by spring 73. When these dies are designed for merely imprinting figures as devices into the paper, they may be formed the same as ordinary embossing-dies. When the blank is to be printed, the type or engraving is placed on the lower die and ink applied in the usual way by means of the ordinary inking-roller, 75, operating while die 65 stands down, as in Fig. 11. This roller 75 is supposed to be supplied with ink, and to be operated by the simple and well-known mechanism commonly used for that purpose on printing-presses. Such a mechanism may comprise these simple elements, arranged as illustrated in Fig. 11. The said roller is or may be supported at the end of a slide, 120, constructed to have a horizontal movement in slide-bearing 121. This movement may be derived from the suitably-shaped cam 127 on shaft S² by means of the usual system of connections, which, as here shown, comprise rod 125, having roller 126 bearing on said cam, angle-lever 123, pivoted at 128 to bracket 122 and link 124. A spring, 130, is provided to move the slide 120 in one direction, the cam being a single-acting one. If preferred, the cam may be double-acting, when said spring may be omitted. After the type is inked, the upper die is brought down against the blank to serve as a platen, while the lower one is brought up through opening 12 to print the under side of said blank.

Passing the printing mechanism, the blank next arrives at the station G of the gumming-mechanism. This mechanism (see Figs. 19, 20) consists of two duplicate portions set opposite to each other—one on each side of carrier C. Corresponding parts of each of said portions are designated by the same characters. As herein shown, the blank is placed on the carrier with its seal flap 76 toward the outside, so that it is gummed by the right-hand and the back flap, 77, by the left-hand gummer Gum is supplied from an ordinary gum-box, G', by the usual revolving roller, R, which is supposed to be operated by some means not shown, usually a pulley and belt. A guide, 78, is fixed across and above the carrier at one side of the gummers, being supported by its downwardly-projecting ends 79. This guide carries a pin, 80, to which are pivoted the oppositely-disposed similar latches, 81, having a side wing, 82, and a wedge-shaped point, 90, resting on the guide. The gummers G², of the kind ordinarily used in envelope-blank-gumming machines, are secured to one end of an arm or lever, 2, which is connected at its other end to a rocker-arm, 3, that is pivoted at 83 to top plate, A. Arms 3 have a stroke the extreme points of which are respectively indicated by solid and dotted lines in Figs. 12 and 20, said arms being operated by an arm, 85, connected at 86 to a rod, 87, which is driven one way by cam 88 and the other way by spring 89. Arm 2 has for supporting it a pin, 91, which rests sometimes on guide 78 and sometimes on wing 82.

As above mentioned, the gummer has a so-called "four-motion" movement. This is produced as follows: The envelope-blank being properly placed on the carrier at 76 and the lower surface of gummer $G^2$ supplied with gum, arm 2 is moved toward said carrier. This forces pin 91 against and up onto wing 82 and slides it along until it drops off the highest end of said wing, thus allowing arm 2 to drop with the gummer on the flap of the blank, as shown in Figs. 19 and 20. Next, arm 2 is drawn back, carrying the gummer off from the blank and over roll R, to be freshly gummed. During this back-stroke pin 91 slides on guide 78 and passes under wing 82 beyond point 90, where it stands ready for performing the same operation upon the next blank. Each side of the gumming mechanism operating simultaneously, the back flap and seal flap of the blank are gummed at once. Leaving the gumming mechanism, the blank is next carried to the station F of the blank-folding mechanism, where it is held at 92 directly under the plunger $F^2$. This plunger is fixed to a stem, 93, which slides in a bearing in bracket 94, and is operated by an arm, 95, which is fixed on a slide, 96, operated by cam 97 on shaft $S^2$. Said plunger is supposed to be about the size of the folded envelope and only slightly smaller than opening 12. Underneath that plunger and the carrier is placed an ordinary folding box, (designated by $F^3$,) which has the usual back-flap-folding wing, $W^2$, end-folding wings W W, and seal-flap-folding wing $W^3$. These folding-wings are all operated from simple cams in the ordinary manner. Wing $W^2$ is operated by cam 98 through a rod, 99, connected to an arm, 100, on said wing. Wings W W are operated by rods 101 101 from similar cams, 102 102, and wing $W^3$ by rod 103 from cam 104. A trap-door, D, of the ordinary description, is employed, on which to fold the envelopes. This is pivoted at 105 to plate A, and is operated by a rod, 106, from cam 108. A trough or other suitable device, 109, Fig. 16, is provided to receive the completed envelopes 110 from door D, this being lowered, as shown by dotted lines in this figure, so that said envelopes will readily slide off.

The operation of this folding mechanism after the carrier has brought a blank under plunger $F^2$ is the same as the ordinary mechanism shown in the above-mentioned Letters Patent, No. 58,327. The plunger first drives the blank down through opening 12 and then returns, the wings then fold down the flaps and lift again, and the trap-door lowers to dispose of the envelope, all these motions being produced by the respective cams described, which are supposed to be suitably shaped therefor.

It should be understood that in referring to the connecting-rods, which are actuated by the several cams, I have assumed the usual cam-rolls, as 112 on rod 106, Fig. 11, to be a part of the rod, and therefore as not requiring special designation.

This machine is capable of modification in various ways and degrees, after the manner of machines in general, within the scope and limits of my invention.

Having thus described my invention, I claim—

1. In an envelope-machine, printing and gumming mechanisms, combined with a traveling blank-supporting table carrying the blanks from the printing to the gumming mechanism, and with means, substantially as described, for imparting motion to said mechanisms, substantially as described.

2. In a system of envelope-making machinery, the combination of a blank-feeding mechanism, substantially as described, a blank-printing mechanism, substantially as described, a blank-gumming mechanism, substantially as described, and a blank-folding mechanism, substantially as described, all located in a circuit in the order described, and a blank-carrier operating to receive blanks from the blank-feeding mechanism and convey them first to the blank-printing mechanism, then to the blank-gumming mechanism, and finally to the blank-folding mechanism, substantially as set forth.

3. In a system of envelope-making machinery, the combination of a blank-feeding mechanism, substantially as described, a blank-printing mechanism, substantially as described, a blank-gumming mechanism, substantially as described, and a blank-folding mechanism, substantially as described, all located, in the order described, in a circular circuit, and a circular blank-carrier operating to receive blanks from the blank-feeding mechanism and convey them first to the blank-printing mechanism or mechanisms, then to the blank-gumming mechanism, and then to the blank-folding mechanism, substantially as set forth.

4. In an envelope-machine, the traveling blank-carrier and gumming apparatuses situated on opposite sides of said carrier and arranged to operate on the blanks on said carrier, all substantially as described.

5. In an envelope-machine, the traveling blank-carrier and gumming apparatuses situated on opposite sides of said carrier and arranged to operate simultaneously on the same envelope-blank on said carrier, all substantially as described.

FRANCIS H. RICHARDS.

Witnesses:
C. O. PALMER,
H. F. L. ORCUTT.